United States Patent [19]

Allison et al.

[11] 3,760,643
[45] Sept. 25, 1973

[54] TRANSMISSION GEARSHIFT LINKAGE

[75] Inventors: William D. Allison, Grosse Pointe Farms; Ernest W. Kitzner, Allen Park, both of Mich.

[73] Assignee: Ford Motor Company, Dearborn, Mich.

[22] Filed: Dec. 22, 1971

[21] Appl. No.: 210,849

[52] U.S. Cl. ............................. 74/473 SW, 74/484
[51] Int. Cl. ............................................. G05g 9/00
[58] Field of Search ................... 74/473 R, 473 SW, 74/475, 476, 484

[56] References Cited
UNITED STATES PATENTS
3,575,061   4/1971   Howes ............................ 74/484 X Primary Examiner—Milton Kaufman
Assistant Examiner—Frank H. McKenzie, Jr.
Attorney—Keith L. Zerschling et al.

[57] ABSTRACT

A transmission gearshift linkage for use with a foreshortened steering column in an automotive vehicle comprising a gearshift lever supported by the steering column in the vehicle passenger compartment and shift linkage elements at the base of the column adapted to be connected to a shift controlling shaft through an engageable selector clutch, and a motion transmitting linkage connecting the shift linkage elements to the ratio controlling elements of the vehicle transmission mechanism comprising compound motion transmitting members, one end of each being connected to a shift linkage element, the other end being connected to a ratio controlling element, an intermediate portion of said members being mounted for compound motion on a stationary portion of said mechanism and a universal connection between said one end of said members and said shift linkage elements, said universal connection being adapted to be disassembled from said shift linkage elements as said motion transmitting linkage and said column become displaced due to an impact loading.

2 Claims, 5 Drawing Figures

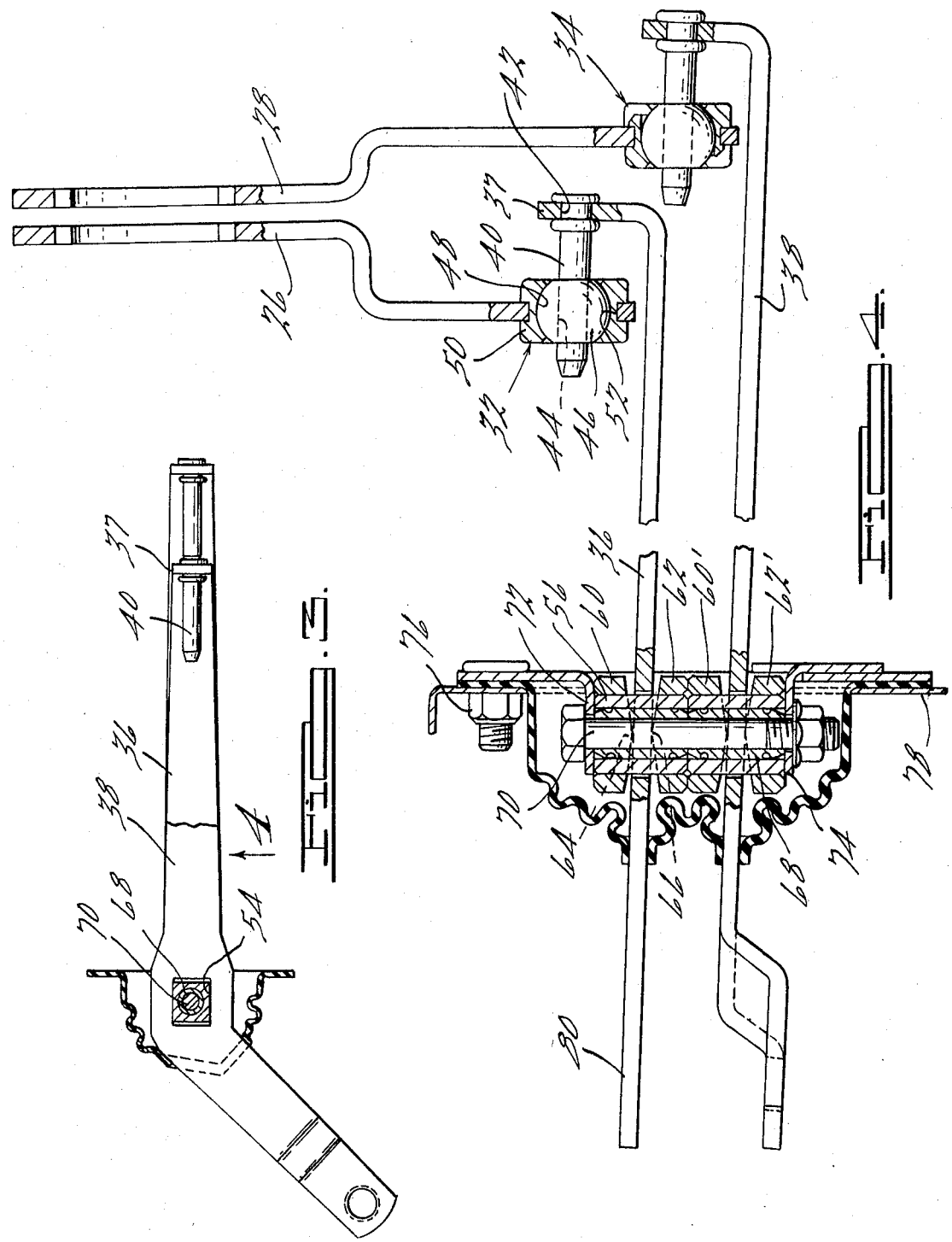

TRANSMISSION GEARSHIFT LINKAGE

GENERAL DESCRIPTION OF THE INVENTION

The improvements of our invention are adapted to be used in gearshift linkage mechanisms in combination with "mini" steering columns of the type disclosed in U.S. Pat. Nos. 3,575,062 and 3,575,061. A linkage mechanism adapted to accommodate our invention is disclosed also in U.S. Pat. No. 3,712,150, which is assigned to the assignee of this invention.

A so-called "mini" steering column of the type disclosed in the aforementioned references comprises a steering wheel support within the passenger compartment. It also includes a column carried by the vehicle dash structure in the vehicle passenger compartment and a ratio controlling sleeve shaft extending over the steering shaft and rotatably journalled on a stationary sleeve portion of the column. The base of the steering shaft, which is foreshortened, is connected to driven portions of the vehicle steering mechanism through a flexible cable which extends through the engine vehicle compartment to the steering gear of the vehicle.

The ratio controlling sleeve shaft may be rotated by the operator of the vehicle. The lower end of the sleeve shaft is clutched selectively to a shift lever if the transmission mechanism is a so-called manually-controlled, multiple-ratio transmission that requires the use of multiple shift levers. If the transmission is an automatic transmission wherein the transmission operating range is selected by appropriately positioning a manual valve, a single shift lever is used, and it may be connected permanently to the shift controlling sleeve shaft rather than through a selectively engageable clutch. In either case, the radially outward end of the shift lever is connected by means of a universal coupling to one end of a compound motion transmitting lever. This latter lever is mounted on a stationary portion of the vehicle body structure by means of a second universal connection. It is connected at its other end by means of motion transmitting linkage elements to ratio controlling parts of the transmission mechanism. In the case of an automatic transmission, these linkage elements are connected to the transmission manual valve. In the case of a manually controlled multiple ratio transmission a pair of shift linkage elements is required, one being connected to each of two transmission shift forks.

In those environments having a manually controlled multiple ratio transmission, a pair of compound motion transmitting levers is required, each being operatively connected to separate ratio controlling elements and each being mounted by means of a universal connection on the vehicle body structure. One end of each compound motion transmitting element would be connected also to a separate one of two transmission shift linkage elements. A universal connection used for mounting the compound motion transmitting member is disclosed in the co-pending Biro application.

The arcuate motion of the ratio shift linkage is translated into generally axial movement of the ratio controlling element. This requires oscillation of the compound motion transmitting member about its first axis and rotary motion of the compound motion transmitting member about an axis perpendicular to the first axis of oscillation. This requires rotation of the driving end of the compound motion transmitting member about the axis of the steering column and it requires also a change in the angular disposition of the operating centerline of the compound motion transmitting member with respect to the axis of the steering column. This rotation and misalignment is accommodated by a universal connection between the shift linkage element and the driving end of the compound motion transmitting lever. Provision is made in the universal connection for disassembly of the shift linkage element from a motion transmitting lever if the gearshift linkage mechanism is driven toward the vehicle passenger compartment as the result of front end or side impacts of the vehicle. The mini steering column is designed to collapse under such impact loading. Displacement of the column in a forward direction as a result of the impact loading will not be inhibited by the shift linkage mechanism.

BRIEF DESCRIPTION OF THE FIGURES OF THE DRAWING

FIG. 3 is a subassembly view showing the compound motion transmitting linkage mechanism;

FIG. 4 is a cross-sectional view as seen in the direction of arrow 4 in FIG. 3;

FIG. 5 is an end view of the universal connection shown in FIGS. 2 and 4.

PARTICULAR DESCRIPTION OF THE INVENTION

Figure 1:
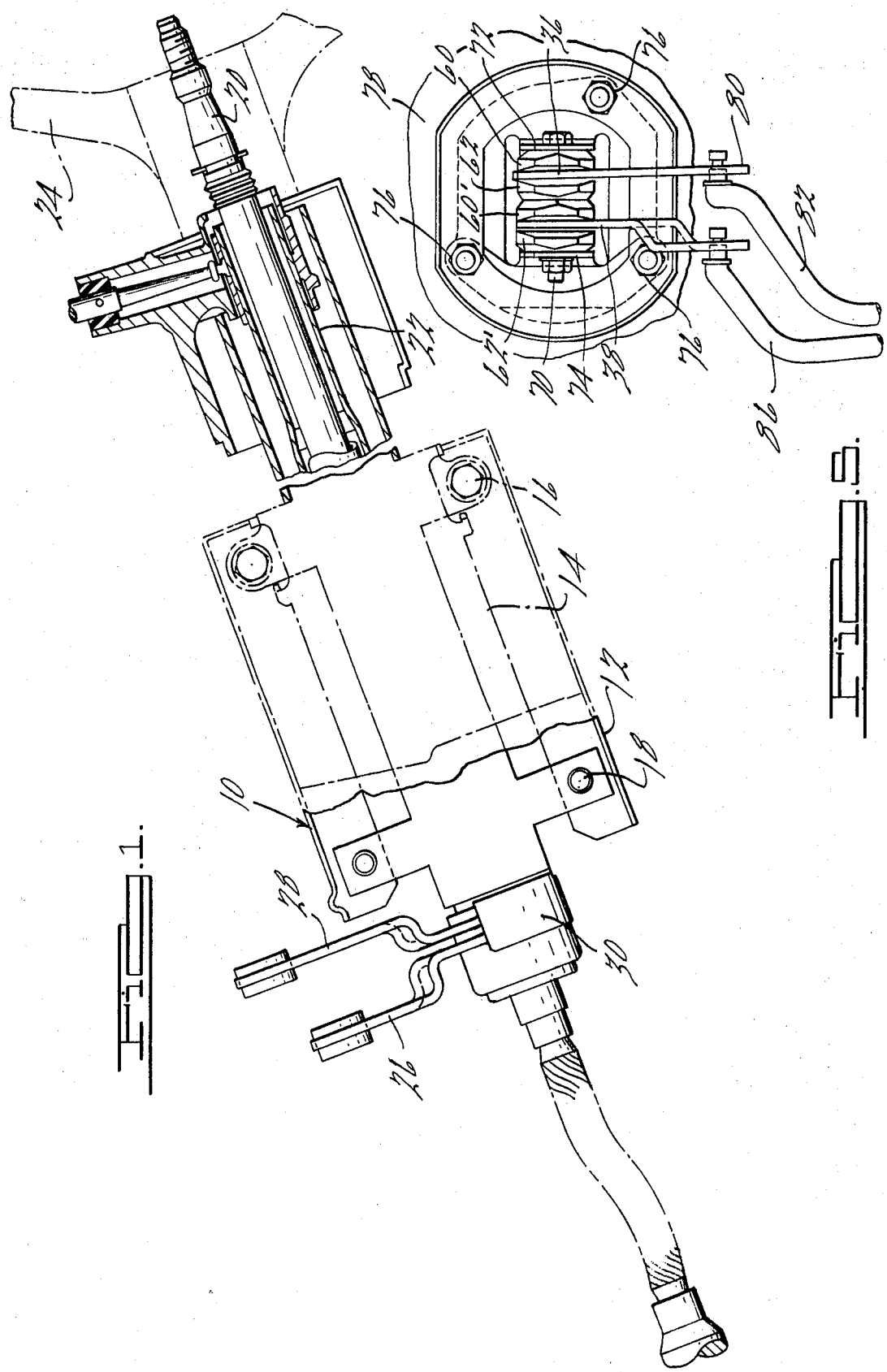
FIG. 1 shows a plan view of a so-called mini steering column having a transmission shift linkage element mounted on it.
Figure 2:
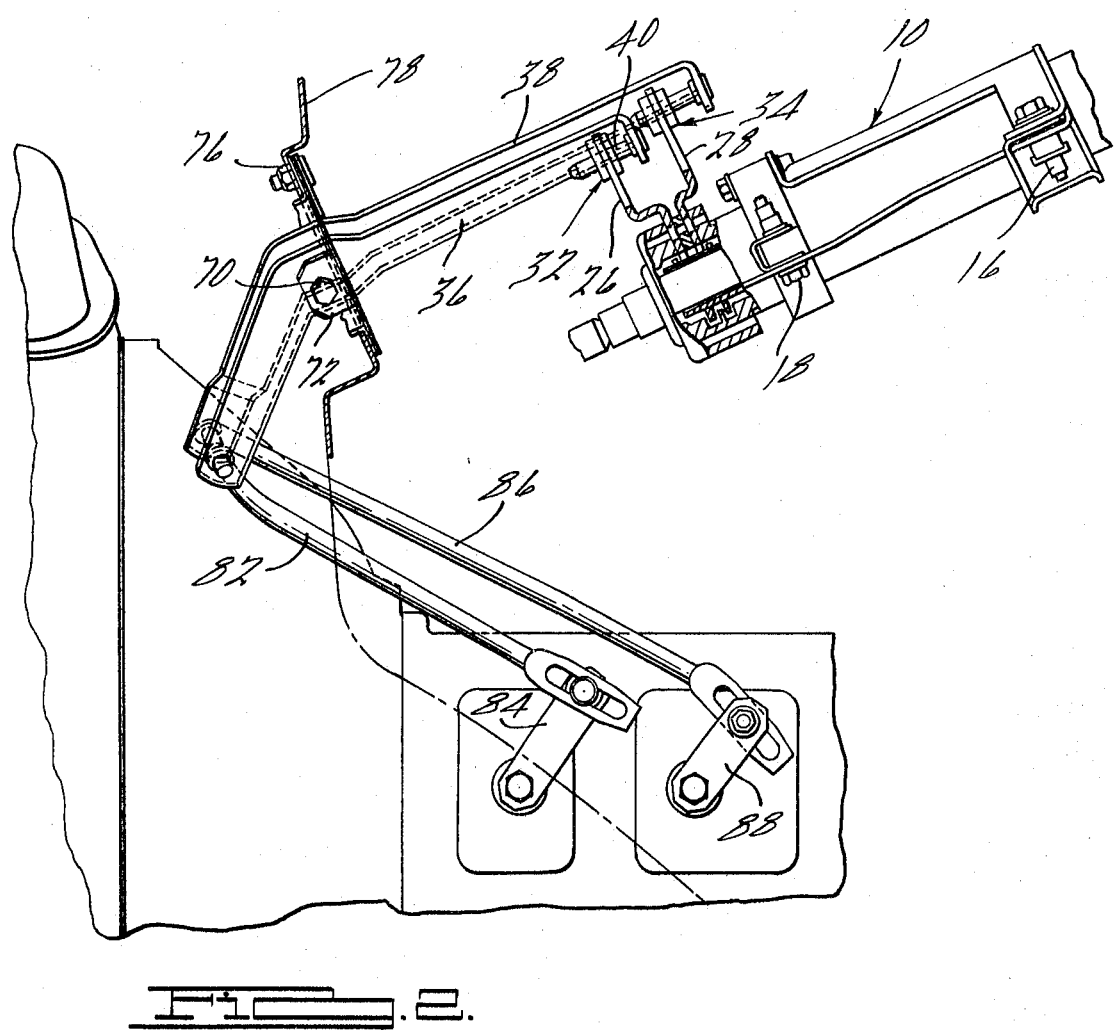
FIG. 2 is a side view, partly in section, showing the assembly of a mini steering column and the principal portions of the gear shift linkage mechanism.

In FIG. 1 a mini steering column is indicated generally by reference character 10. It includes a housing 12 and stationary support structure 14 which may be bolted by means of bolts 16 and 18 to the vehicle dash structure. Vehicle steering shaft 20 is journalled within the support 14 and a driver-operated shift controlling sleeve shaft 22 is rotatably journalled in the housing about the shaft 20. Shaft 20 supports steering wheel 24 within the vehicle passenger compartment.

The gearshift mechanism in this particular embodiment controls ratio changes in a manually controlled three-speed power transmission mechanism. It includes two shift linkage elements shown at 26 and 28. Element 26, which is adapted to be clutched selectively to the left-hand end of the sleeve shaft 22, controls ratio changes between neutral and third and between neutral and second. Ratio shift linkage element 28, which is also adapted to be connected to the left-hand end of the sleeve shaft 22, controls ratio changes between neutral and first and between neutral and the reverse speed ratio. A selectively engageable clutch mechanism, such as that described in U.S. Pat. No. 3,575,061, is enclosed within the clutch housing structure 30 for selectively connecting elements 26 and 28 to the sleeve shaft 22. When either of the elements 26 or 28 is connected to the shaft 22, it may be rotated upon rotation of the shaft 22 by the vehicle operator.

The radially outward ends of the elements 26 and 28 carry universal couplings 32 and 34, respectively. These form universal connections with compound motion transmitting members 36 and 38, respectively. The connections are identical and for this reason only one of them will be described.

Member 36 has an end portion 37 which forms a right angle and which overlies the extended end of lever 26. On its rearward side portion 37 carries a stem 40 which is secured at one end within opening 42 in the portion 37. Stem 40 is slidably received within opening 44 in a spherical bearing member 46 which registers with a socket recess 48 in bearing member 50. This bearing member in turn is received within opening 52 formed in the radially outward end of lever 26.

Bearing member 46 may rotate with a universal motion within the socket member 50. In addition stem 40 may slide within the opening 44. The rotary motion of the bearing members permits misalignment of the member 36 with respect to the axis of oscillation of the element 26. It also permits rotation of the member 36 about the axis of the sleeve shaft 22. If the steering column 10 is displaced axially due to an impact load, bearing member 46 will slide off stem 40 thereby disengaging the steering column from member 36;

The universal connection between the stationary dash structure and the members 36 and 38 will be described only briefly here since they are described in full detail in co-pending application of Steven E. Biro, identified previously. Member 36 includes a rectangular opening 54 which receives a rectangular member 56 extending transversely with respect to the plane of member 36. Sufficient clearance is provided between the member 56 and the opening 54 to permit relative movement of one with respect to the other. A first pivot member 60 is located on one side of the member 36 and a second pivot member 62 is located on the opposite side. Each pivot member is formed with oblique surfaces that define a pivot line of intersection, as indicated at 64 and 66, respectively. A bearing sleeve 68 is received within the central opening formed in member 56. A clamping bolt 70 extends through the sleeve 68 and secures the assembly to angle brackets 72 and 74. These in turn are bolted by bolts 76 to the forward wall 78 of the vehicle body.

Bearing sleeve 68 permits the member 36 to rotate about the axis of the bolt 70. At the same time member 36 may pivot on the pivot lines 64 and 66. Thus both angular adjustment of the member 36 about the axis of the bolt 70 and angular displacement of the member 36 about an axis that is perpendicular to the axis of the bolt 70 is accommodated.

Lever 38 also is supported on the vehicle dash structure by a universal connection which inlcudes pivot members 60' and 62'. This pivotal connection is identical to the one described with reference to member 36.

The end of member 36 is connected to one end of ratio controlling element 82. Element 82 includes a pivotal end that is received through an opening formed in the end 80. The other end of the element 82 is connected drivably to one end of gearshift linkage member 84, which in turn is connected within the transmission to a transmission ratio shift fork for controlling ratio changes between the neutral condition and the third speed ratio and between the neutral condition and second speed ratio. The corresponding ratio controlling element for ratio changes between neutral and the first speed ratio and between neutral and the reverse speed ratio is shown at 86. One end of rod element 86 is connected to member 38 and the other end thereof is connected to shift linkage member 88 of the transmission mechanism.

In the embodiment illustrated in the drawings, the mechanism is adapted to control a manually-controlled three-speed transmissions. If the transmission mechanism is an automatic power transmission mechanism with a manual selector valve, only one compound motion transmitting lever is required; in which case the motion transmitting connection between the shift selector shaft and the manual valve would duplicate one of the two motion transmitting lever systems illustrated in the drawings. The mechanism shown in the drawings and the corresponding mechanism for an automatic power transmission include interchangeable parts, thereby resulting in a further economy during assembly of vehicles that are capable of being installed with either an automatic or a manual transmission.

Having described a preferred embodiment of our invention, what we claim and desire to secure by U.S. Letters Patent is:

1. In a vehicle steering column a gearshift lever assembly having a steering shaft, a shift sleeve shaft surrounding the steering shaft, means for mounting the sleeve shaft and the steering shaft within a vehicle passenger compartment, a gearshift lever connected drivably to one end of said sleeve shaft remote from a vehicle passenger compartment, the other end of said sleeve shaft being adapted to be rotated by the vehicle operator, a compound motion transmitting member, a transmission ratio controlling element operatively connected to one end of said compound motion transmitting member, a universal connection between an intermediate portion of said compound motion transmitting member and a stationary portion of said assembly, a universal coupling connecting between the other end of said compound motion transmitting member and said shift lever comprising a first universal bearing member carried by the radially outward end of said shift lever and a second universal bearing member carried by said other end of said compound motion transmitting member, said second universal bearing member comprising a stem extending through said second universal bearing member whereby said shift lever may be disengaged from said compound motion transmitting lever as the latter is shifted with respect to said column in the direction of the axis of said column.

2. The combination as set forth in claim 1 wherein said second universal bearing member has a spherical portion and said first universal bearing member forms a spherical socket receiving said spherical portion, an opening in said spherical member having an axis generally parallel to the axis of said column, said stem being slidably received through said opening, the support for said stem being located on the side of said first bearing member opposite from the side closest to the universal connection at the intermediate portion of said compound motion transmitting member.

* * * * *